(12) United States Patent
Cho

(10) Patent No.: US 7,437,827 B2
(45) Date of Patent: Oct. 21, 2008

(54) HEADWEAR-SIZE MEASURING APPARATUS

(75) Inventor: Byoung-Woo Cho, Gyeonggi-do (KR)

(73) Assignee: Yupoong, Inc. (KR)

( * ) Notice: Subject to any disclaimer, the term of this patent is extended or adjusted under 35 U.S.C. 154(b) by 52 days.

(21) Appl. No.: 11/516,893

(22) Filed: Sep. 7, 2006

(65) Prior Publication Data

US 2007/0294902 A1    Dec. 27, 2007

(30) Foreign Application Priority Data

Jun. 27, 2006    (KR)    .................. 10-2006-0058026

(51) Int. Cl.
*G01B 3/00*    (2006.01)
*A42B 1/00*    (2006.01)

(52) U.S. Cl. .................. 33/555.1; 33/512; 223/10

(58) Field of Classification Search ............. 33/555.1, 33/511, 512, 542, 549, 555.2, 555.4, 561.1–561.3, 33/2 R, 3 A, 3 B, 3 C, 8; 223/10, 24–26; 73/159

See application file for complete search history.

(56) References Cited

U.S. PATENT DOCUMENTS

| | | | | | |
|---|---|---|---|---|---|
| 75,760 | A | * | 3/1868 | Hogan ................ | 33/514.2 |
| 390,178 | A | * | 9/1888 | Lyons ................... | 223/26 |
| 447,751 | A | * | 3/1891 | Lyons ................... | 223/25 |
| 1,065,856 | A | * | 6/1913 | Wickersheim ........ | 223/25 |
| 1,701,160 | A | * | 2/1929 | Miller ................... | 223/25 |
| 1,914,864 | A | * | 6/1933 | Purcell ................. | 223/25 |
| 1,975,711 | A | * | 10/1934 | Borden ................ | 73/861.65 |
| 2,087,158 | A | * | 7/1937 | Lindsey ................ | 223/25 |
| 2,142,554 | A | * | 1/1939 | Bonjokian ............. | 223/26 |
| 2,556,230 | A | * | 6/1951 | Starbuck .............. | 33/512 |
| 2,643,461 | A | * | 6/1953 | Wiebe .................. | 33/542 |
| 4,417,401 | A | * | 11/1983 | Aisaka et al. ......... | 33/512 |
| 5,715,540 | A | | 2/1998 | Cho | |
| 5,862,522 | A | | 1/1999 | Cho | |
| 6,067,658 | A | | 5/2000 | Cho | |
| 6,089,421 | A | | 7/2000 | Cho | |
| 6,115,844 | A | | 9/2000 | Cho | |
| 6,119,273 | A | | 9/2000 | Cho | |
| 6,129,250 | A | | 10/2000 | Cho | |
| 6,314,583 | B1 | | 11/2001 | Cho | |
| D505,775 | S | | 6/2005 | Cho | |
| 6,986,166 | B2 | | 1/2006 | Cho | |
| D514,281 | S | | 2/2006 | Cho | |

(Continued)

*Primary Examiner*—G. Bradley Bennett
*Assistant Examiner*—Amy Cohen Johnson
(74) *Attorney, Agent, or Firm*—Fellers, Snider, Blankenship, Bailey & Tippens

(57) ABSTRACT

A headwear-size measuring apparatus measures a size of a headwear, an elastic band, or the like and also measures a pressure applied to a wearer's head on wearing the headwear. The headwear-size measuring apparatus includes: a controller; a driving source controlled by the controller; an object extending unit having a diameter size controlled by an operation of the driving source; a pressure measuring unit for measuring an applied pressure of an object and provided at the object extending unit and transmitting the measured value to the controller; an input unit for receiving an established value and transmitting the received value to the controller; a standard data base connected to the controller such that data are transmitted to the controller and storing standard-object sizes and ranges of appropriate pressure applied to a head corresponding to the object sizes; and an output unit for displaying data processed by the controller.

17 Claims, 10 Drawing Sheets

U.S. PATENT DOCUMENTS

| | | |
|---|---|---|
| 7,011,034 B2 | 3/2006 | Cho |
| D520,716 S | 5/2006 | Cho |
| D521,713 S | 5/2006 | Cho |
| 7,225,554 B2 * | 6/2007 | Madsen .................. 33/512 |
| 2004/0019954 A1 | 2/2004 | Park |
| 2004/0154140 A1 | 8/2004 | Cho |
| 2004/0231031 A1 | 11/2004 | Cho |
| 2004/0231033 A1 | 11/2004 | Cho |
| 2004/0250338 A1 | 12/2004 | Cho |
| 2005/0066419 A1 | 3/2005 | Lee |
| 2005/0066420 A1 | 3/2005 | Kim |
| 2005/0081279 A1 | 4/2005 | Cho |
| 2005/0132469 A1 | 6/2005 | Kim |
| 2005/0155135 A1 | 7/2005 | Cho |
| 2005/0160518 A1 | 7/2005 | Cho |
| 2005/0160519 A1 | 7/2005 | Cho |
| 2005/0223472 A1 | 10/2005 | Shin |
| 2005/0223473 A1 | 10/2005 | Cho |
| 2005/0223474 A1 | 10/2005 | Cho |
| 2006/0048274 A1 | 3/2006 | Lee |
| 2006/0048275 A1 | 3/2006 | Cho |
| 2006/0090244 A1 | 5/2006 | Cho |
| 2007/0079424 A1 | 4/2007 | Cho |
| 2007/0083982 A1 | 4/2007 | Cho |

* cited by examiner

HEADWEAR-SIZE MEASURING APPARATUS

CROSS-REFERENCE TO RELATED APPLICATION

This application claims priority to and the benefit of Korean Patent Application No. 10-2006-0058026 filed in the Korean Intellectual Property Office on Jun. 27, 2006, the entire contents of which are incorporated herein by reference.

BACKGROUND OF THE INVENTION (a) Field of the Invention

The present invention relates to a headwear-size measuring apparatus. More particularly, the present invention relates to a headwear-size measuring apparatus for measuring a size of a cap, a visor, an elastic band, or the like, and also for measuring a pressure applied to a wearer's head on wearing the same.

(b) Description of the Related Art

Generally, a user selects a headwear appropriate for the user's head by looking at a size marked on a label of the headwear. However, in a conventional headwear, the size marked on the label is often different from an actual size, and accordingly, a difference of wearing comfort occurs. Thus, the user may not be able to rely on the headwear. In addition, the size may not be constant between when the user first buys a headwear and then secondarily buys the same headwear from the same company after a certain duration, and accordingly, the user may not be able to rely on the headwear.

In order to solve such a problem, a headwear-manufacturer must determine an ideal standard pressure that should be applied to a wearer's head for each respective headwear sizes and confirm whether the size marked on the label corresponds to the actual size. Generally, a headwear size is measured using a tapeline, a hand measurer, or the like. In the case that the headwear size is measured using such a tapeline or hand measurer, there is a drawback in that the user cannot rely on the measured size since a measuring person's force is not always applied uniformly. That is, since headwear have no fixed or standardized shape, in the case that headwear size is manually measured by a tapeline, the reliability of the measured size may be decreased because the measured size may differ due to the measuring person's force. When the size marked on the headwear label does not correspond with the actually manufactured headwear size, and accordingly the pressure applied to the wearer's head differs even with headwear of the same label size, a wearing comfort is differed, thereby reducing the good's quality.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a headwear-size measuring apparatus having advantages of manufacturing a headwear such that a headwear-size marked on the headwear's label is in concordance with the actual size and pressure applied to a head is within an optimum range, thereby increasing the good's quality.

An exemplary embodiment of the present invention provides a headwear-size measuring apparatus including: a controller; a driving source controlled by the controller; an object extending unit having a diameter size controlled by an operation of the driving source; a pressure measuring unit for measuring an applied pressure of an object and provided at the object extending unit and transmitting the measured value to the controller; a size measuring unit for measuring a size of the object and provided at the object extending unit and transmitting the measured size to the controller; an input unit for receiving an established value and transmitting the received value to the controller; a standard data base connected to the controller such that data are transmitted to the controller and storing standard-object sizes and ranges of appropriate pressure applied to a head corresponding to the object sizes; and an output unit for displaying data processed by the controller.

The driving source may include a motor.

The object extending unit may include: a rotating screw rotated by the driving source; a first moving member connected to an exterior circumferential surface of the rotating screw and moved in an axis direction of the rotating screw; a plurality of second moving members hinged to the first moving member and provided in a radial direction; a plurality of third moving members hinged to the second moving members and moved in a radial direction based on a center shaft of the rotating screw; a plurality of guides for guiding the third moving members; and a plurality of head parts connected to the third moving members and moved along with the third moving members in a radial direction based on a center shaft of the rotating screw.

The pressure measuring unit may include a plurality of load cells for measuring a pressure applied to the head and is connected to a side surface of the object extending unit. The size measuring unit may include a sensor for measuring a diameter variance of the object extending unit. The head parts may include a first fixed jaw portion for supporting a headwear's visor portion at one side. The head parts may include a second fixed jaw portion for supporting a rear portion of the headwear at one side. There may be a plurality of the object extending units.

DETAILED DESCRIPTION OF THE EMBODIMENTS

Exemplary embodiments of the present invention will hereinafter be described in detail with reference to the accompanying drawings.

Figure 1:
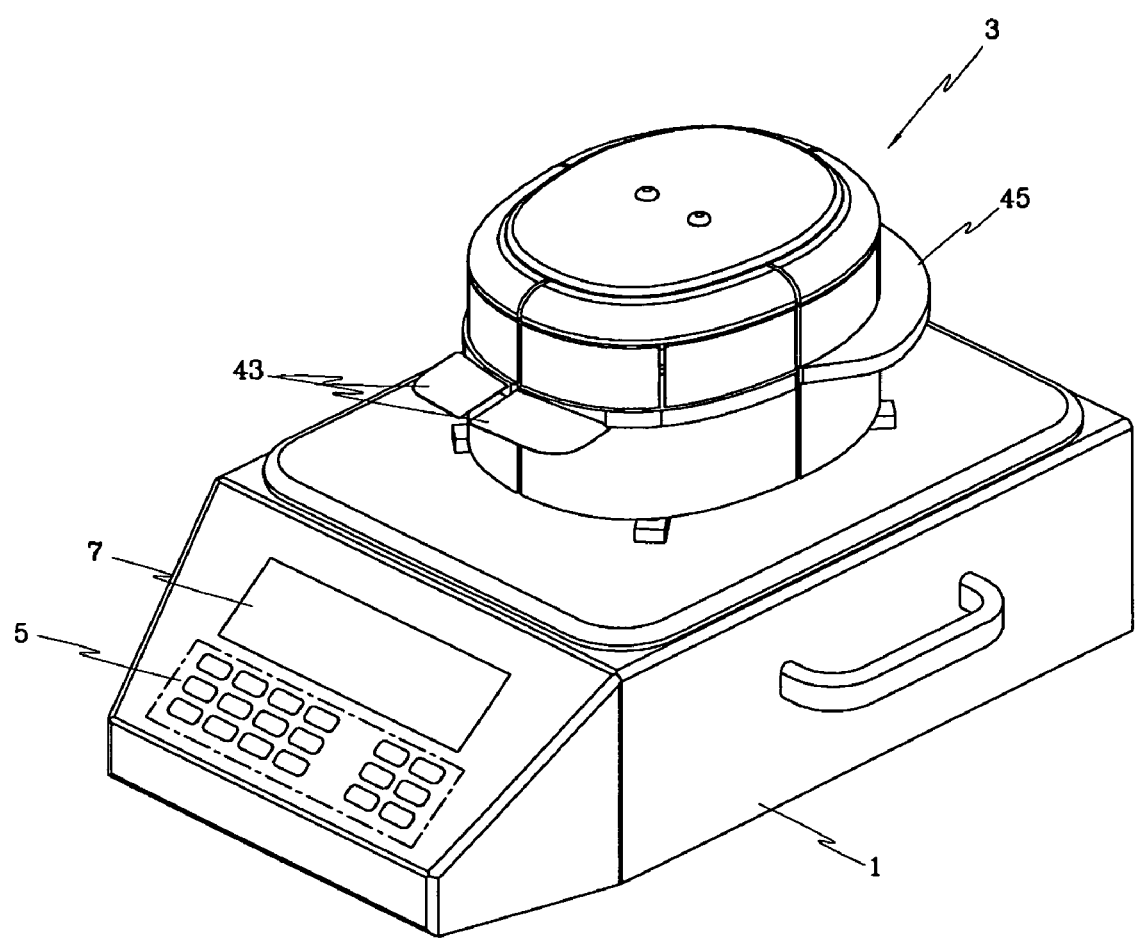
FIG. 1 is a perspective view of a headwear-size measuring apparatus according to an exemplary embodiment of the present invention.
Figure 2:
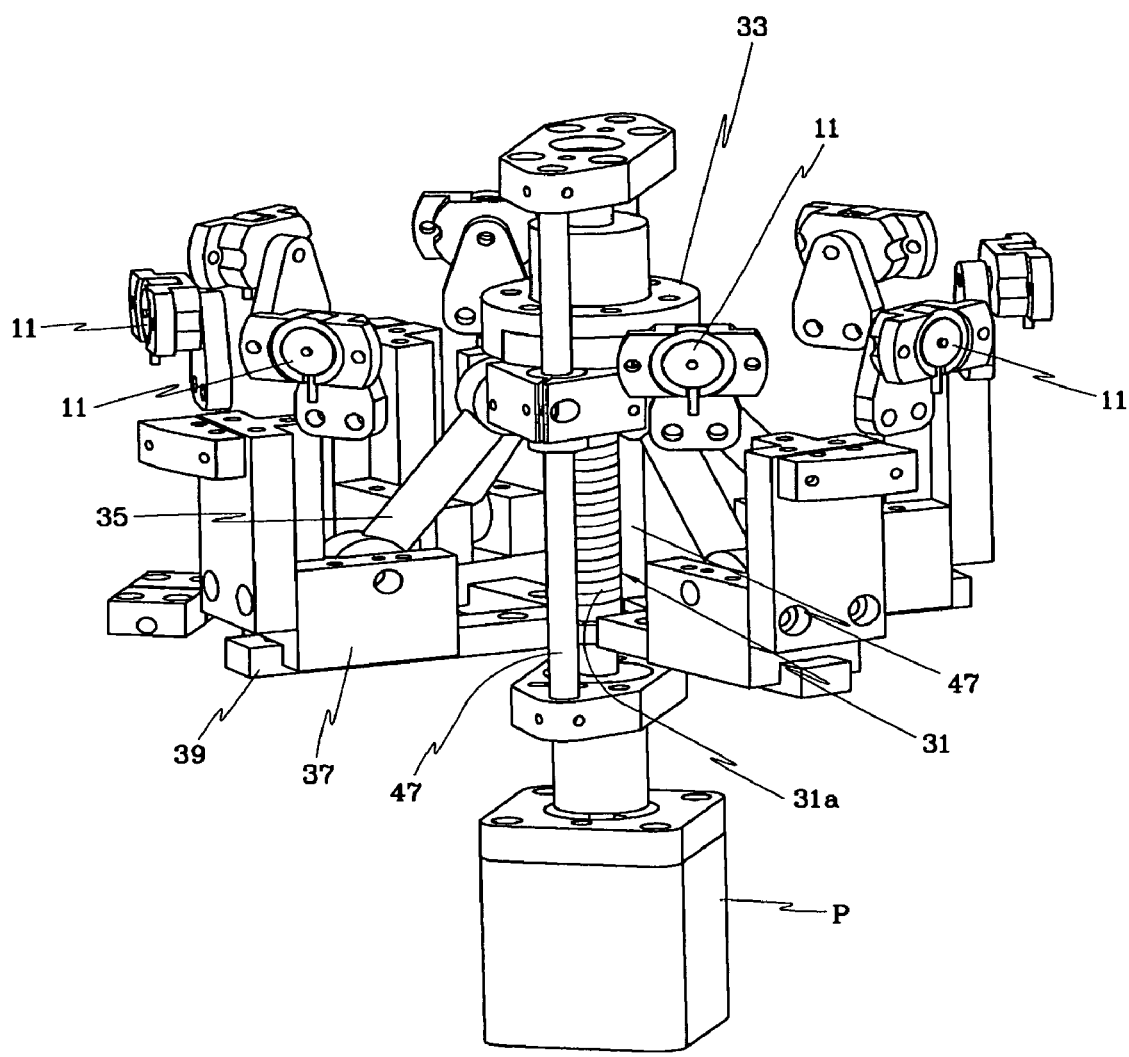
FIG. 2 illustrates an exemplary inner structure of the headwear-size measuring apparatus of FIG. 1 showing how the headwear-size measuring apparatus operates and its structure.
Figure 3:
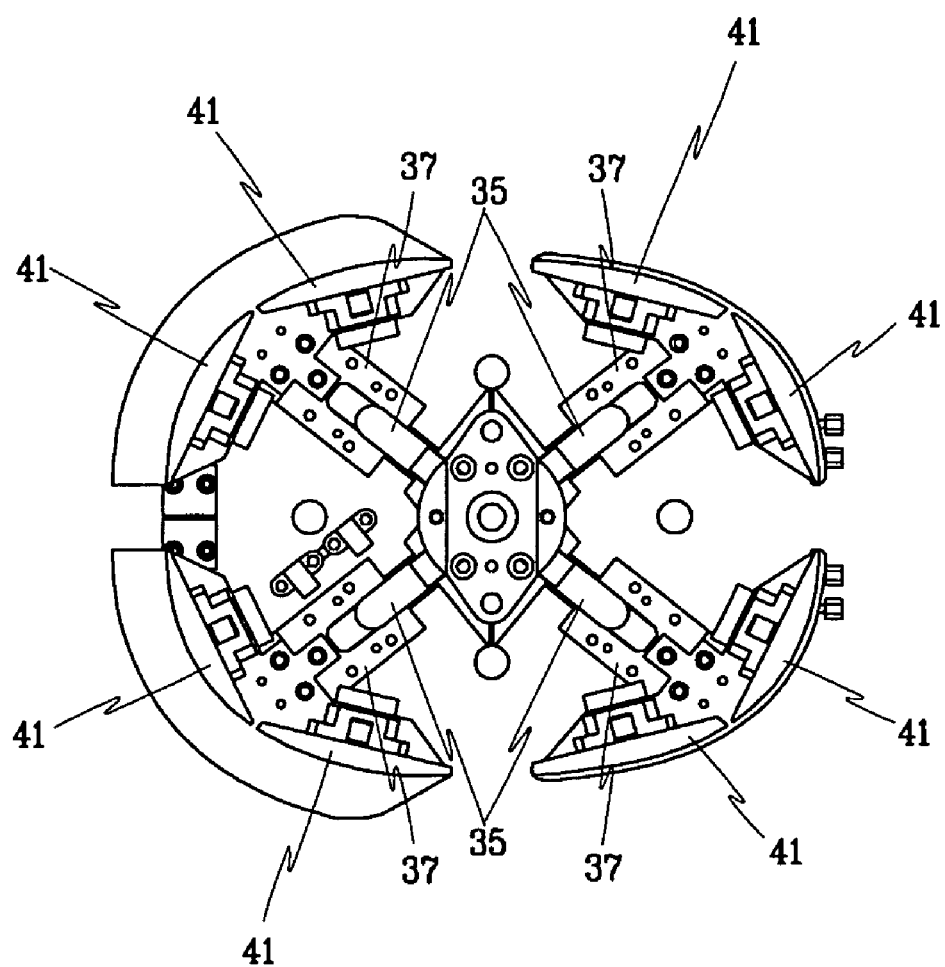
FIG. 3 is a top plan view of a primary inner structure of the headwear-size measuring apparatus of FIG. 1 according to the exemplary embodiment of the present invention.

FIG. 1 is a perspective view of a headwear-size measuring apparatus according to an exemplary embodiment of the present invention, FIG. 2 illustrates an exemplary inner structure of the headwear-size measuring apparatus of FIG. 1 showing how the headwear-size measuring apparatus operates and its structure, and FIG. 3 is a top plan view of a primary inner structure of the headwear-size measuring apparatus of FIG. 1 according to the exemplary embodiment of the present invention.

Such a headwear-size measuring apparatus includes a case 1 and an object extending unit 3 placed on the case 1. The case 1 may include a controller CT, an input unit 5 for receiving data, an output unit 7, and a data base 9 for storing standard size and standard pressure data (see FIG. 6).

The object extending unit 3 has a structure capable of providing a headwear H (shown in FIG. 4) or an elastic band E (shown in FIG. 5) at the periphery thereof and of decreasing or increasing a diameter thereof in a radial direction based on an shaft thereof, wherein the elastic band is formed in a circle band type combined to a wearing portion (generally referred to as a crown portion, that is, a part for covering a head of the wearer).

The object extending unit 3 includes a pressure measuring unit 11 that measures a pressure applied to the wearer's head by the headwear H or elastic band E and a size measuring unit 13 (shown in FIG. 6) which has a distance measuring sensor for measuring an extended distance so as to measure a headwear size.

The input unit 5 receives necessary data and may be provided at a front side of the case 1. Such an input unit 5 may have a keypad-type structure as shown in FIG. 1, and may have additional input ports (not shown) for receiving data such that a lot of data may be input.

Figure 8:
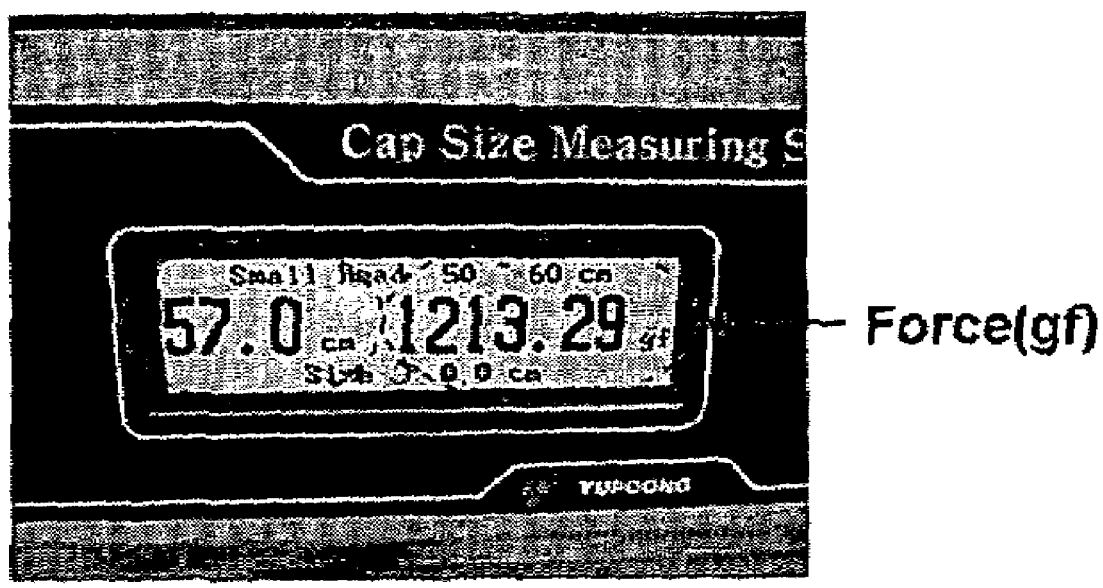
FIG. 8 is photograph of an applicable output unit according to the exemplary embodiment of the present invention.

In addition, the output unit 7 may be provided at a front side of the case 1 as shown in FIG. 1 and FIG. 8 such that the user may easily recognize the processed data from the controller CT.

It is one example that such an output unit 7 is formed as a flat display panel in FIG. 1. However, the output unit 7 may include a printer or additional monitors not incorporated into the case 1. The output unit 7 may have an output port to output data therethough.

The standard data base 9 is connected to the controller CT such that the data and the electrical signals are transmitted/received therebetween and is for storing data that have allowable pressure ranges applied to the head with respect to the respective headwear sizes or elastic band sizes.

For example, when the headwear size is given as 57 cm, such data may include an allowable pressure range applied to the head of the wearer such as 1,100 gf to 1,300 gf.

That is, the data corresponding to the allowable pressure ranges applied to the wearer's head with respect to each size may be stored in the standard data base 9.

Such standard data may be used for the controller CT to compare data such that the elastic band or the completed headwear may be manufactured within the allowable pressure range applied to the wearer's head for each size and be put on the market.

It is preferable for such standard data to be formed by putting various-sized headwear on a plurality of users, researching a wearing comfort through a questionnaire, and measuring a pressure applied to the head by the selected headwear having the best wearing comfort.

The object extending unit 3 measures a pressure applied to the headwear by the same having a predetermined size by extending the elastic band or the headwear in a radial direction thereof.

Such an object extending unit 3 may be provided on the upper surface of the case 1 and may be driven by a driving source P, such as a motor controlled by the controller CT.

As shown in FIG. 2, the object extending unit 3 includes a rotating screw 31 connected to a rotating shaft of the driving source P, a first moving member 33 connected to an exterior circumferential surface of the rotating screw 31 such that it may relatively move opposite to the rotating screw 31, a plurality of second moving members 35 hinged in a radial direction to the first moving member 33, and a plurality of third moving members 37 hinged to the second moving members 35 such that they move in a radial direction based on a rotating center of the rotating screw 31.

The object extending unit 3 further includes guides 39 for guiding the third moving members 37 such that the third moving members 37 may move in a radial direction relative to an axis direction of the rotating screw 31.

In addition, the object extending unit 3 includes head parts 41 that are connected to the third moving members 37, form an exterior view, and are covered by the inner of the elastic band or the headwear's wearing portion.

The rotating screw 31 has a screw thread 31a at the exterior circumferential surface thereof.

The first moving member 33 has a screw groove (not shown) corresponding to the screw thread 31a of the rotating screw 31 at the interior circumferential surface such that the first moving member 33 may be moved in a longitudinal direction along the rotating screw 31.

The driving source P is fixed to the case 1, and accordingly, the rotating screw 31 may be rotated in situ and the first moving member 33 may be moved along the rotating screw 33.

The second moving members 35 have one side portion hinged to the first moving member 33 and the other side portion hinged to the third moving members 37, and are provided in a radial direction.

The second moving members 35 allow the third moving members 37 to move in a radial direction relative to an axis direction of the rotating screw 31 according to the movement of the first moving member 33.

The third moving members 37 move in a radial direction relative to an axis direction of the rotating screw 31 along to the guides 39.

Four second moving members 35 and third moving members 37 respectively are provided in a radial direction (i.e., in a circumferential direction).

However, the number of members is not limited thereto, and three or five second moving members 35 and third moving members 37 may be provided.

The third moving members 37 are connected to the head parts 41 forming an external view as shown in FIG. 3. Generally, two head parts 41 may be connected to each third moving member 37, and accordingly, eight head parts 41 may be connected to the third moving members 37 when four third moving members 37 are provided.

The head parts 41 have a curved shape at the exterior surface, and accordingly, such head parts are easily inserted into the interior circumference of the elastic band or the headwear's wearing portion.

In addition, one head parts 41 has at least one first fixed jaw portion 43 (shown in FIG. 1) for supporting a visor portion S of the headwear (shown in FIG. 4) at one side portion and an opposite head parts 41 has a second fixed jaw portion 45 for supporting a lower portion of the headwear's wearing portion.

Meanwhile, the first moving member 33 may be guided by other guides 47 provided in parallel to the rotating screw 31.

The third moving members 37 are connected to the pressure measuring unit 11, and the pressure measuring unit 11 includes load cells for measuring a pressure applied by the head parts 41. That is, the load cells are connected to respective third moving members 37.

The load cells measure a pressure applied to the band or headwear when the head parts 41 are covered with the band or headwear and are extended to the predetermined head size. The pressure measuring unit 11 having such load cells is connected to the controller CT, and accordingly, the measured signal may be transmitted to the controller CT. The pressure measuring unit 11 may not use the load cells, but may use other means capable of measuring a pressure applied to the head while the head is covered with the headwear.

Figure 6:
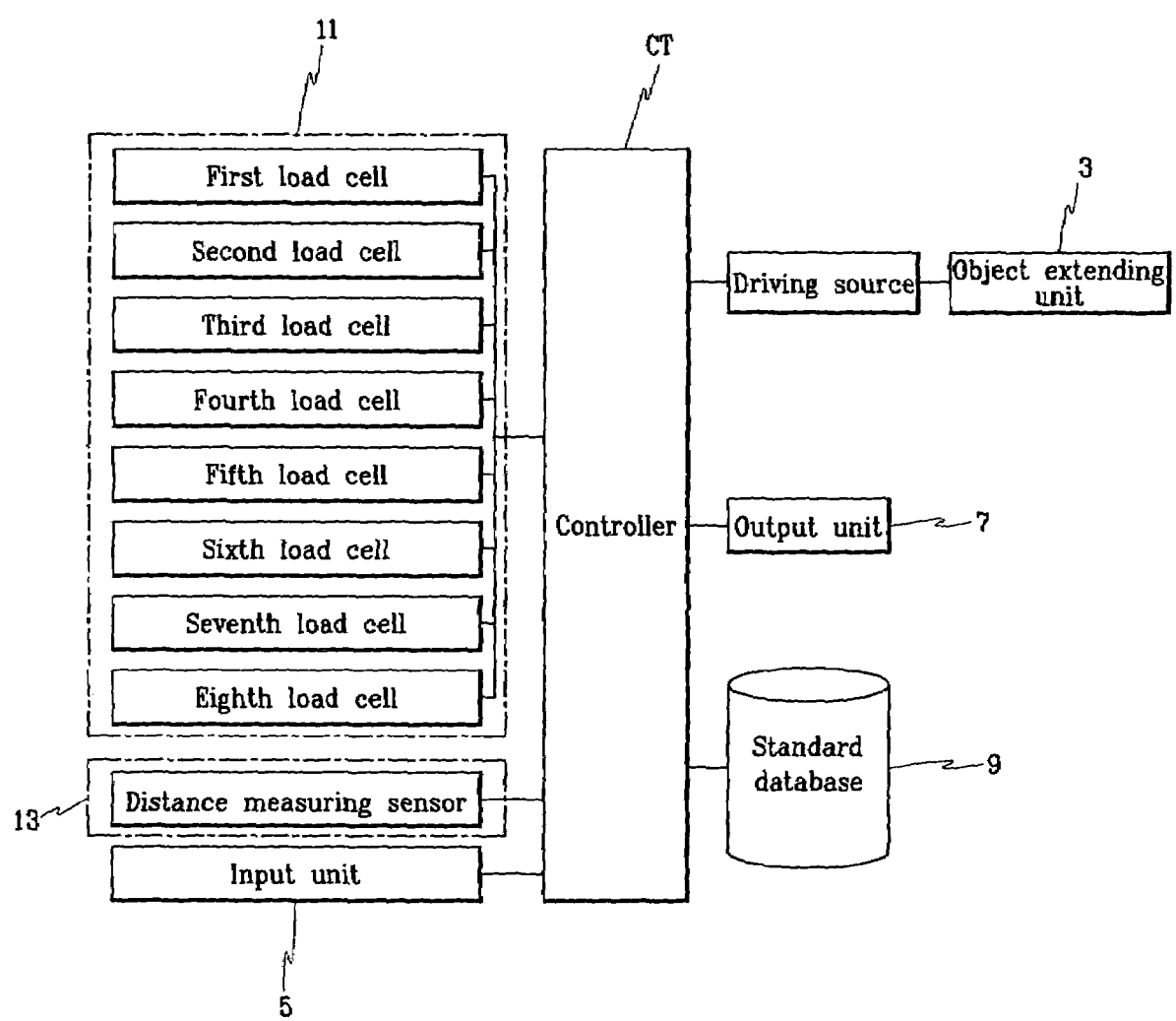
FIG. 6 is a partial block diagram of a headwear-size measuring apparatus according to the exemplary embodiment of the present invention.

As shown in FIG. 6, the size measuring unit 13 for measuring an elastic band size or a headwear's wearing portion size may be connected to the controller CT. The size measuring unit 13 may use a sensor for sensing a moving distance of the third moving members 37.

That is, the size measuring unit 13 senses the moving distance of the third moving members 37 and transmits the sensed value to the controller CT, and the controller CT may calculate a total circumference along the exterior circumferential surfaces of the head parts 41. Accordingly, the size measuring unit 13 may measure the actual size of the elastic band or the headwear's wearing portion.

According to the exemplary embodiment of the present invention, it is one example that the size measuring unit 13 measures the moving distance of the moving members 37 by means of the length measuring sensor to calculate the size of the elastic band or headwear's wearing portion supported by the head parts 41. However, other measuring means capable of measuring the size of the elastic band or the headwear's wearing portion may be applied.

A method for the size and pressure measuring units measuring a size of an elastic band or a headwear's wearing portion and a pressure applied to the wearer's head in correspondence with each size according to an exemplary embodiment of the present invention will now be described.

Figure 4:
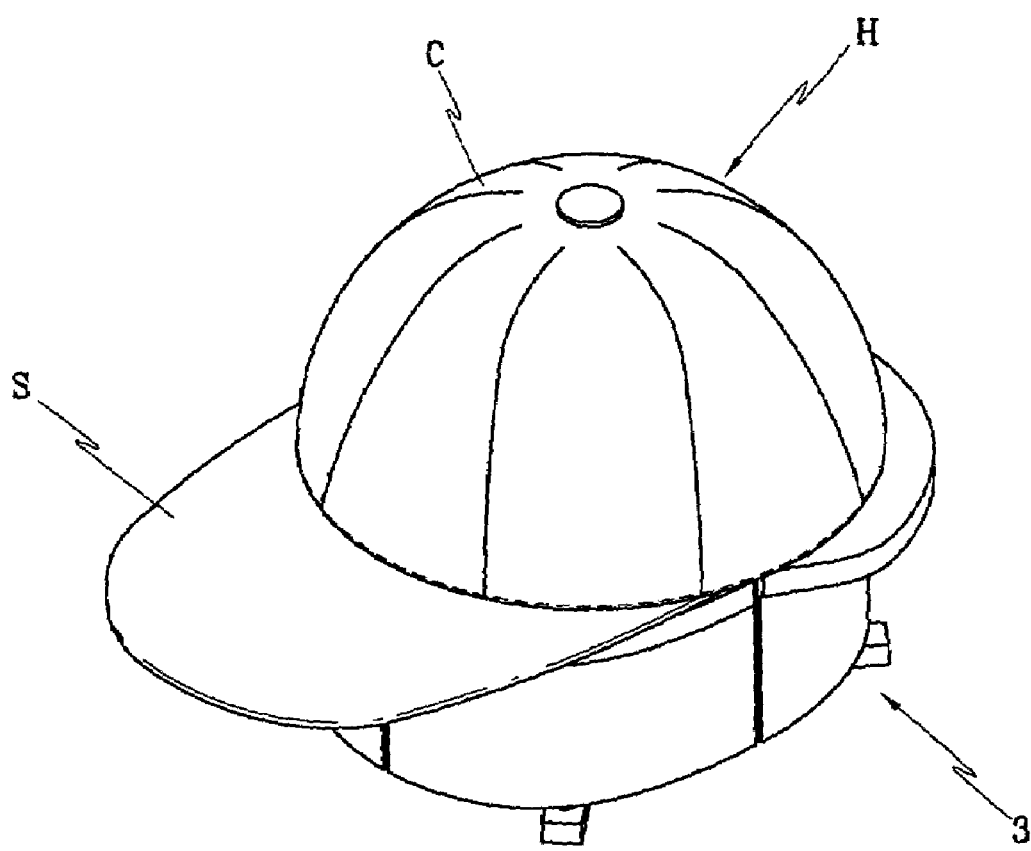
FIG. 4 illustrates how a headwear size and a pressure applied to a wearer's head in a wearing state are measured according to the exemplary embodiment of the present invention.
Figure 5:
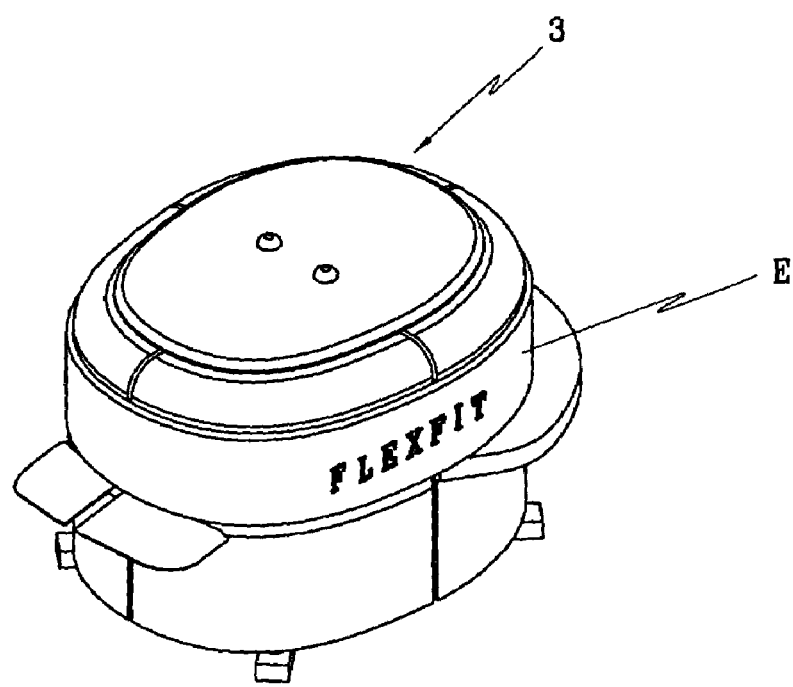
FIG. 5 illustrates how an elastic band size and a pressure applied to the wearer's head by the same in a wearing state are measured according to the exemplary embodiment of the present invention.

FIG. 4 illustrates how a size of a headwear H's wearing portion C and a pressure applied to the wearer's head are measured, and FIG. 5 illustrates how a size of an elastic band E used in a headwear and a pressure applied to the wearer's head are measured.

That is, according to an exemplary embodiment of the present invention, before manufacturing a headwear, a size of an elastic band connected to a wearing portion and a pressure applied to a head by the elastic band may be measured. Thus, the completed headwear may use only satisfactorily tested elastic bands thereby having a uniform quality.

Figure 7:
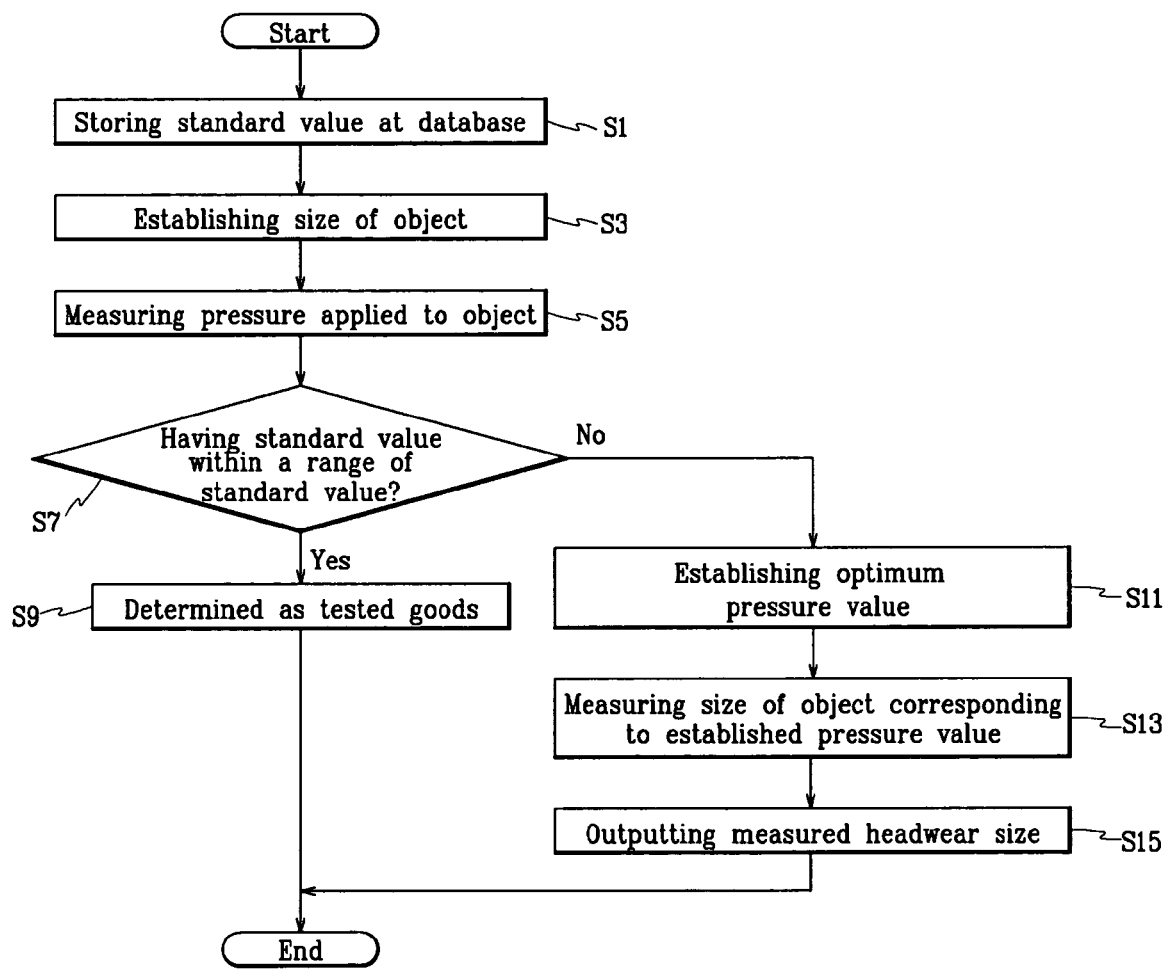
FIG. 7 is a flowchart showing how an elastic band size and a pressure applied to the wearer's head by the same are measured according to the exemplary embodiment of the present invention.

A method for measuring an appropriate size and identifying inferior goods by determining whether a predetermined size headwear has a pressure satisfying a standard value will now be described with reference to FIG. 7.

The standard values of pressures applied to the head along to a circumference of each elastic band or headwear's wearing portion are stored in the data base (S1).

As shown in FIG. 4, the head parts 41 are covered by the headwear. The headwear size is input into the input unit 5 (S3). That is, when the manufactured headwear has a size of 57cm, the size 57cm is input into the input unit 5.

And then the pressure applied to the head (i.e., head of the wearer) by the headwear is measured (S5). At this time the motor is driven, and accordingly, the rotating screw 31 is rotated in situ.

According to the rotation of the rotating screw 31, the first moving member 33 moves in an axis direction of the rotating screw 31. At this time, the first moving member 33 is guided by the guides 47, thereby improving accuracy. According to the movement of the first moving member 33, the second moving members 35 move in a radial direction.

According to the movement of the second moving members 35, the third moving members 37 are guided to the other guides 39, and accordingly, move in a circumferential direction (in a radial direction) relative to an axis direction of the rotating screw 31.

And then, the head parts 41 connected to the third moving members 37 apply a pressure to an interior surface of the headwear's wearing portion. At this time, the pressure measuring units 11 connected to the third moving members 37 measure the pressure.

The measured pressure is displayed in the output unit 7 under a control of the controller CT (shown in FIG. 8).

The controller CT compares a measured value to the standard data value and determines whether the measured value is within a predetermined range (S7).

That is, as shown in FIG. 8, when the measured and displayed pressure value is given as 1,213.29 gf and the standard pressure value range stored in the standard data base is given as 1,100 gf to 1,300 gf, the controller CT determines the headwear as a satisfactorily tested good.

In this manner, when it is determined that the measured value is within the range of standard values, the satisfactory determination of the tested goods is displayed (S9).

However, when it is determined that the measured value is not within the range of standard values, an optimum pressure value is established and input (S11).

And then, the controller measures the headwear's size corresponding to the input pressure value (S13) by the size measuring unit 13.

For example, the optimum pressure value 1,200 gf is input into the input unit 5. When the pressure applied to the head is measured as 1,200 gf, the headwear size is measured and found to be 60cm, and so the headwear size is determined as 60cm. And then, the measured headwear size is output by the output unit 7 (S15).

According to the above exemplary embodiment of the present invention, it is one example that the case 1 includes the input unit 5, the output unit 7, the integrated controller (CT), and the integrated standard data base 9. However, as shown in FIG. 9 and FIG. 10, the case 1 may be connected in a wired or wireless way to a conventional personal computer system.

Figure 9:
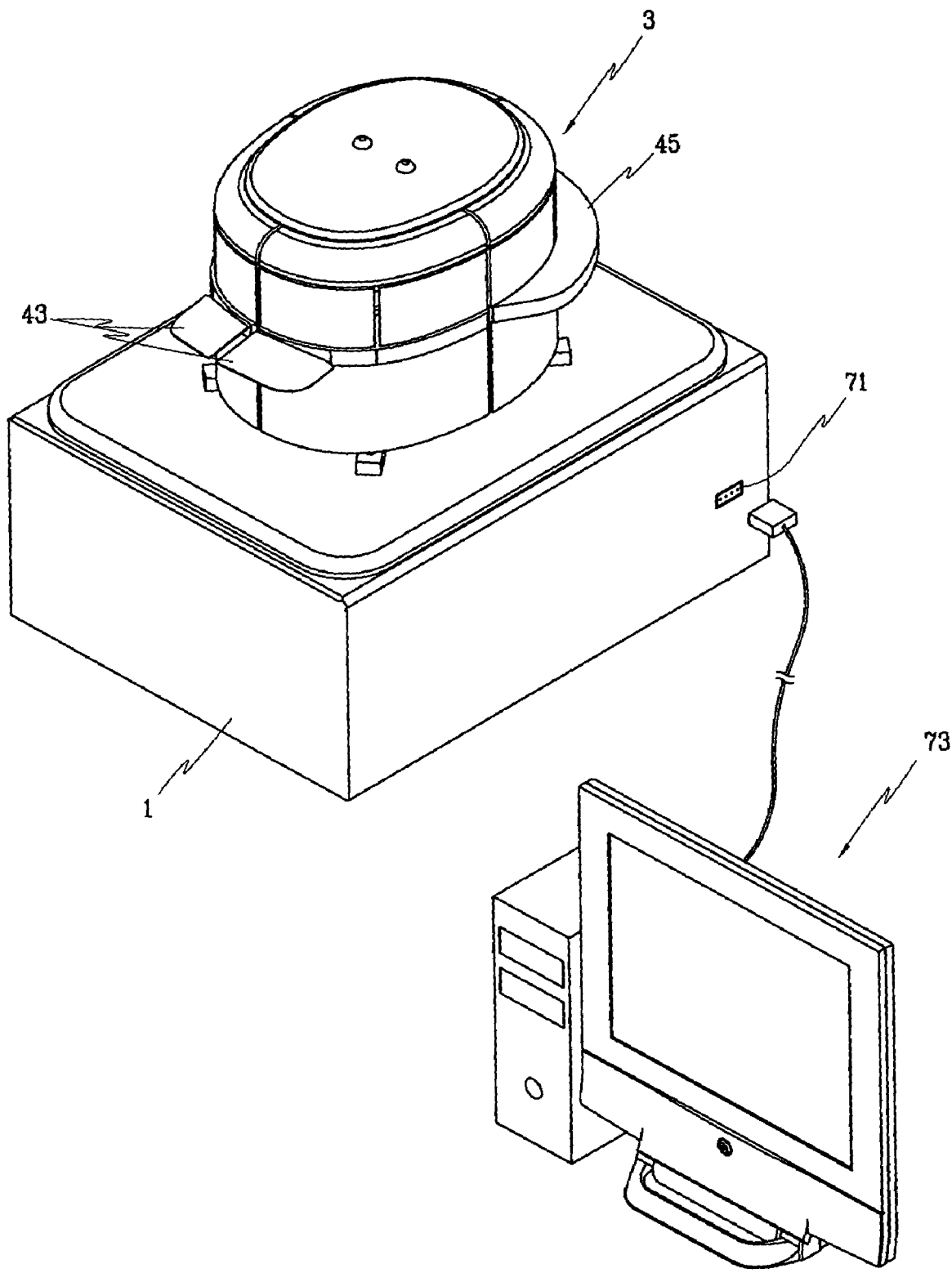
FIG. 9 is a perspective view of a headwear-size measuring apparatus according to another exemplary embodiment of the present invention.

That is, in FIG. 9, the case 1 includes a communication port 71 with input and output ports for transmitting/receiving data to/from exterior systems. The communication port 71 is electrically connected to the pressure measuring unit 11, the size measuring unit 13, and the driving source P such that it receives data therefrom or controls the driving source P.

The communication port 71 may be formed as a connector forming a wired connection to a conventional computer 73 as a data processing apparatus as FIG. 9.

Figure 10:
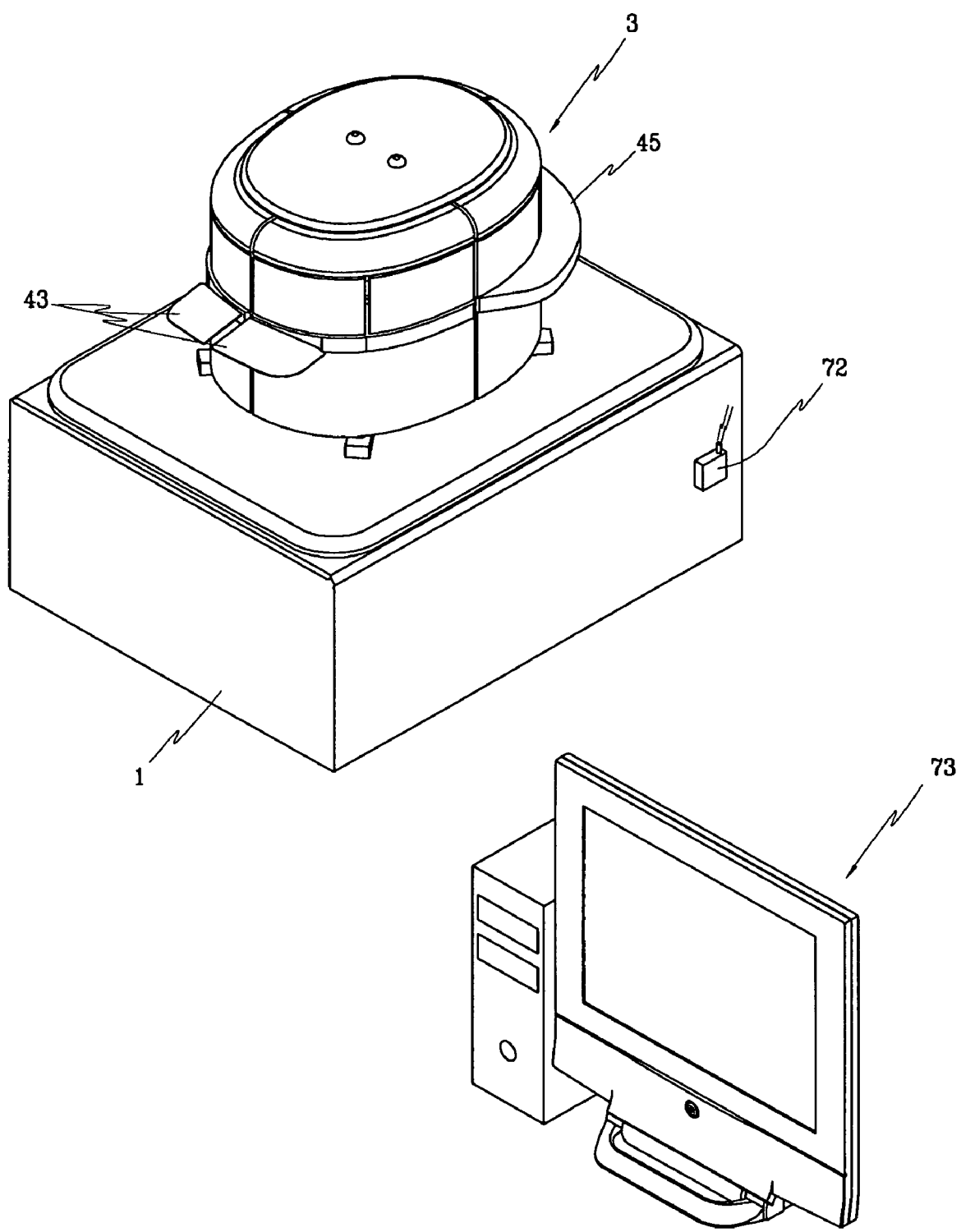
FIG. 10 is a perspective view of a headwear-size measuring apparatus according to a further exemplary embodiment of the present invention.

In addition, as shown in FIG. 10, the communication port 72 may be formed as a data receiving apparatus capable of wireless communication with a conventional computer 73 as a data processing apparatus.

According to an exemplary embodiment of the present invention, the object extending unit 3 may be separately manufactured, and may be connected in wired or wireless way to the computer 73 or the like.

According to an exemplary embodiment of the present invention, a headwear-size measuring apparatus may be easily and variously manufactured and used.

Operation of the object extending unit shown in FIG. 9 and FIG. 10 is the same as described for that of the object extending unit of the first exemplary embodiment of the present invention.

Accordingly, the operation of the object extending unit 3 shown in FIG. 9 and FIG. 10, and a headwear-size measuring method using the same, will not be described again for convenience of description.

According to an exemplary embodiment of the present invention, tested goods applying a pressure to the head within an appropriate range according to each headwear size may be put on the market.

Accordingly, when a user buys and wears the same size of headwear, the user may always feel a uniform wearing comfort, thereby increasing the good's quality. In addition, before manufacturing a headwear, a size of an elastic band connected to a wearing portion of the headwear and a pressure applied to a head by the elastic band may be measured. Thus, tested goods are applied to the actual headwear thereby reducing inferior goods.

According to an exemplary embodiment of the present invention, it is easily confirmed that the pressure applied to the head according to the manufactured headwear size is appropriate, and accordingly, a precise size is shown on the label so that uniform wearing comfort may be provided, thereby improving a user's reliability.

In addition, according to exemplary embodiments of the present invention, before manufacturing a headwear, a size of an elastic band used in the headwear and a pressure applied to a head by the elastic band may be determined. Thus, a precise size of the elastic band may be used in the manufacturing of the headwear, thereby reducing inferior goods and improving the good's quality.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A headwear-size measuring apparatus, comprising:
   a controller;
   a driving source controlled by the controller;
   an object extending unit for receiving headwear, said object extending unit having a diameter size controlled by an operation of the driving source;
   a pressure measuring unit for measuring an applied pressure of an object and provided at the object extending unit and transmitting the measured value to the controller;
   a size measuring unit for measuring a size of the object and provided at the object extending unit and transmitting the measured size to the controller;
   an input unit for receiving an established value and transmitting the received value to the controller;
   a standard data base comprising a data set of sizes and allowable pressure values for each size and connected to the controller such that the controller compares the data set to that measured by the pressure measuring unit and the size measuring unit; and
   an output unit for displaying data processed by the controller.

2. The headwear-size measuring apparatus of claim 1, wherein the driving source includes a motor.

3. The headwear size-measuring apparatus of claim 1, wherein the object extending unit comprises:
   a rotating screw rotated by the driving source;
   a first moving member connected to an exterior circumferential surface of the rotating screw and moved in an axis direction of the rotating screw;
   a plurality of second moving members hinged to the first moving member and provided in a radial direction;
   a plurality of third moving members hinged to the second moving members and moved in a radial direction based on a center shaft of the rotating screw;
   a plurality of guides for guiding the third moving members; and
   a plurality of head parts connected to the third moving members and moved along with the third moving members in a radial direction based on a center shaft of the rotating screw.

4. The headwear size-measuring apparatus of claim 3, wherein the plurality of head parts include a first fixed jaw portion for supporting a headwear's visor portion at one side.

5. The headwear size-measuring apparatus of claim 3, wherein
   the plurality of head parts include a second fixed jaw portion for supporting a rear portion of the headwear at one side.

6. The headwear size-measuring apparatus of claim 1, wherein the pressure measuring unit includes a plurality of load cells for measuring a pressure applied to a plurality of head parts configured to approximate a size of a human head and is connected to a side surface of the object extending unit.

7. The headwear-size measuring apparatus of claim 1, wherein the size measuring unit includes a sensor for measuring a diameter variance of the object extending unit.

8. The headwear size-measuring apparatus of claim 1, wherein there is a plurality of the object extending units.

9. A headwear-size measuring apparatus, comprising:
   an input port for receiving a control signal; a driving source controlled by the received signal;
   an object extending unit for receiving headwear, said object extending unit having a diameter size controlled by an operation of the driving source;
   a pressure measuring unit for measuring an applied pressure of an object and provided at the object extending unit;
   a size measuring unit for measuring a size of the object and provided at the object extending unit; and
   an output port for outputting a pressure value measured by the pressure measuring unit and a size value measured by the size measuring unit.

10. The headwear-size measuring apparatus of claim 9, further comprising: a controller connected to the input port and outputting the control signal to the input port, and connected to the output port and receiving the measured pressure value and size value;

an input unit for receiving an established value and transmitting the established value to the controller;

a standard data base comprising a data set of sizes and allowable pressure values for each size and connected to the controller such that the controller compares the data set to that measured by the pressure measuring unit and the size measuring unit;and an output unit for displaying data processed by the controller.

11. The headwear size-measuring apparatus of claim 10, wherein the input andoutput ports are connected to the controller in a wired or wireless way.

12. The headwear size-measuring apparatus of claim 10, wherein the data processing apparatus is a computer.

13. The headwear size-measuring apparatus of claim 9, wherein the object extending unit comprises:

a rotating screw rotated by the driving source;

a first moving member connected to an exterior circumferential surface of the rotating screw and moved in an axis direction of the rotating screw;

a plurality of second moving members hinged to the first moving member and provided in a radial direction;

a plurality of third moving members hinged to the second moving members and moved in a radial direction based on a center shaft of the rotating screw;

a plurality of guides for guiding the third moving members; and a plurality of head parts connected to the third moving members and moved along with the third moving members in a radial direction based on a center shaft of the rotating screw.

14. The headwear size-measuring apparatus of claim 13, wherein the plurality of head parts include a first fixed jaw portion for supporting a headwear's visor portion at one side.

15. The headwear size-measuring apparatus of claim 13, wherein the plurality of head parts include a second fixed jaw portion for supporting a rear portion of the headwear at one side.

16. The headwear size-measuring apparatus of claim 9, wherein the pressure measuring unit includes a plurality of load cells for measuring a pressure applied to the head and is connected to a side surface of the object extending unit.

17. The headwear size-measuring apparatus of claim 9, wherein the sizemeasuring unit includes a sensor for measuring a diameter variance of the object extending unit.

\* \* \* \* \*